(12) United States Patent
Shekhar et al.

(10) Patent No.: US 11,342,852 B2
(45) Date of Patent: May 24, 2022

(54) APPARATUS, SYSTEM, AND METHOD FOR REDUCING VOLTAGE OVERSHOOT IN VOLTAGE REGULATORS

(71) Applicant: Intel Corporation, Santa Clara, MN (US)

(72) Inventors: Sameer Shekhar, Portland, OR (US); Amit K. Jain, Portland, OR (US); Alexander Waizman, Sunnyvale, CA (US); Michael Zelikson, Haifa (IL); Chin Lee Kuan, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 15/631,996

(22) Filed: Jun. 23, 2017

(65) Prior Publication Data

US 2018/0375438 A1     Dec. 27, 2018

(51) Int. Cl.
| | |
|---|---|
| *H02M 3/158* | (2006.01) |
| *H02M 3/335* | (2006.01) |
| *G05F 1/46* | (2006.01) |
| *H02M 1/36* | (2007.01) |
| *H02M 3/24* | (2006.01) |

(52) U.S. Cl.
CPC .......... *H02M 3/33569* (2013.01); *G05F 1/46* (2013.01); *G05F 1/465* (2013.01); *H02M 1/36* (2013.01); *H02M 3/158* (2013.01); *H02M 3/24* (2013.01); *H02M 3/335* (2013.01)

(58) Field of Classification Search
CPC ........ H02M 3/156; H02M 3/158; H02M 3/24; H02M 3/335; H02M 3/33569; G05F 1/46; G05F 1/462; G05F 1/465
See application file for complete search history.

(56) References Cited

U.S. PATENT DOCUMENTS

| | | | |
|---|---|---|---|
| 9,837,897 B2 * | 12/2017 | Harshey | H02M 3/157 |
| 2008/0054860 A1 * | 3/2008 | Angell | H02M 3/158 323/234 |
| 2011/0140649 A1 * | 6/2011 | Choi | H02J 3/32 320/101 |
| 2014/0152279 A1 * | 6/2014 | Howes | G05F 1/10 323/273 |

(Continued)

FOREIGN PATENT DOCUMENTS

| | | |
|---|---|---|
| CN | 102099993 | 6/2011 |
| JP | 2007288974 | 11/2007 |

(Continued)

OTHER PUBLICATIONS

International Search Report and Written Opinion from PCT/US2018/029973 notified Aug. 13, 2018, 13 pgs.

(Continued)

*Primary Examiner* — Matthew V Nguyen
(74) *Attorney, Agent, or Firm* — Schwabe, Williamson & Wyatt, P.C.

(57) ABSTRACT

An apparatus is provided which comprises: a first voltage regulator; a second voltage regulator; and a switch to selectively couple the first voltage regulator to the second voltage regulator, such that a first output node of the first voltage regulator is temporarily coupled to a second output node of the second voltage regulator via the switch.

26 Claims, 7 Drawing Sheets

(56) References Cited

U.S. PATENT DOCUMENTS

| | | | | |
|---|---|---|---|---|
| 2014/0167727 A1* | 6/2014 | Bridge | ................. | H02J 7/0031 |
| | | | | 323/311 |
| 2015/0008890 A1* | 1/2015 | Sasao | ..................... | H02M 1/08 |
| | | | | 323/271 |
| 2015/0014999 A1 | 1/2015 | Fujii et al. | | |
| 2015/0256067 A1* | 9/2015 | Bayer | .................... | H02M 1/08 |
| | | | | 323/282 |
| 2015/0381026 A1* | 12/2015 | Tournatory | .......... | H02M 3/158 |
| | | | | 323/271 |
| 2016/0105113 A1* | 4/2016 | Tsuzaki | .................. | G05F 1/573 |
| | | | | 323/271 |
| 2016/0156264 A1* | 6/2016 | Masuko | ............... | H02M 3/156 |
| | | | | 323/217 |

FOREIGN PATENT DOCUMENTS

| | | |
|---|---|---|
| JP | 2015146711 | 8/2015 |
| KR | 20120030763 | 3/2012 |

OTHER PUBLICATIONS

International Preliminary Report on Patentability from PCT/US2018/029973 notified Jan. 2, 2020, 10 pgs.

* cited by examiner

APPARATUS, SYSTEM, AND METHOD FOR REDUCING VOLTAGE OVERSHOOT IN VOLTAGE REGULATORS

BACKGROUND

A voltage regulator may aim to regulate a voltage (e.g., aim to automatically maintain a constant voltage level) that may be output to a load. Transient voltage overshoot in a voltage regulator, e.g., due to a rapid or sudden decrease in a load current of the voltage regulator, may not be desirable. Such voltage overshoot may, for example, cause damage to one or more components of the load, and may even lead to component failure.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

A voltage regulator may aim to regulate an output voltage supplied to a load. The output voltage may have a transient overshoot, if, for example, a corresponding load current decreases rapidly.

In some embodiments, two adjacent voltage domains may have two corresponding voltage regulators. Each voltage regulator may have one or more corresponding capacitors, e.g., through which such transient overshoot of corresponding output voltages may be suppressed. However, if, for example, there is a high overshoot in a first voltage regulator, a corresponding first one or more capacitors may not have sufficient capacity to suppress the output voltage sufficiently.

Accordingly, in some embodiments, if there is a high transient overshoot in a first voltage regulator of a first voltage domain, the first voltage regulator may be temporarily coupled to an adjacent second voltage regulator of an adjacent second voltage domain (although in some examples, the first voltage regulator may be temporarily coupled to more than one adjacent voltage domains). This may result in excess energy of the first voltage regulator's energy storing element (e.g., which may cause the voltage overshoot in the first voltage regulator) to be dissipated via not only the first one or more capacitors of the first voltage regulator, but also in parallel via a second one or more capacitors of the second voltage regulator (and possible through capacitors of additional adjacent voltage domains to which the first voltage domain may be temporarily coupled). In some embodiments, the excess energy may also be used by the second voltage domain to charge a load in the second voltage domain.

In some embodiments, a voltage regulator may operate based on detecting an error between an output voltage and a reference voltage. For example, an error signal may be indicative of a difference between the output voltage and the reference voltage. In some embodiments, if a transient overshoot is detected and/or anticipated in the output voltage, a switch may couple the error signal to the ground. This may result in the error signal being zero or near zero, as a result of which the voltage regulator may reduce the energy in voltage regulator energy storage element. This, for example, may reduce or eliminate the transient overshoot in the output voltage. Some embodiments of the voltage regulator may include other topologies such as switched capacitance, boost and/or buck-boost. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

Figure 1:
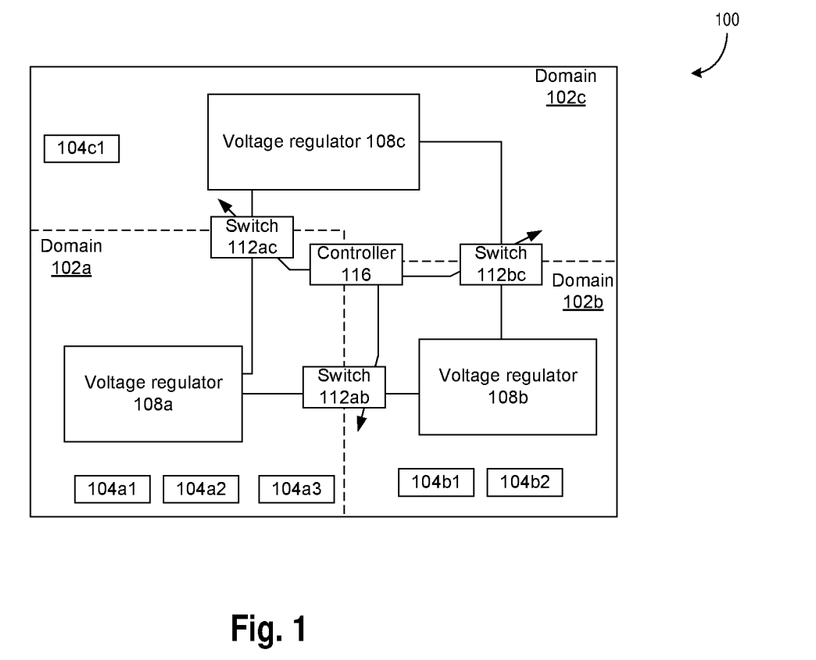
FIG. 1 schematically illustrates a device comprising a plurality of voltage domains that may be selectively interconnected to reduce a voltage overshoot in a voltage domain, according to some embodiments.

FIG. 1 schematically illustrates a device 100 comprising a plurality of voltage domains that may be selectively interconnected to reduce a voltage overshoot in a voltage domain, according to some embodiments. In some embodiments, the device 100 may be a system on a chip (SOC). In some embodiments, the device 100 may be incorporated, for example, in any appropriate computing device.

In some embodiments, the device 100 may be functionally divided in multiple voltage domains (henceforth also referred to as "domains"), e.g., domains 102a, 102b, and 102c (henceforth also referred to as domain 102 in singular, and domains 102 in plural). Boundaries between these domains are illustrated using dashed lines. Although three specific domains are illustrated in FIG. 1, such a number, shapes, and/or positions of the domains are merely example.

In some embodiments, each domain 102 may have one or more corresponding voltage regulators, and one or more corresponding components. For example, domain 102a may comprise a voltage regulator 108a for regulating voltage level of power supplied to components 104a1, 104a2, and 104a3 of domain 102a; domain 102b may comprise a voltage regulator 108b for regulating voltage level of power supplied to components 104b1 and 104b2 of domain 102b; and domain 102c may comprise a voltage regulator 108c for regulating voltage level of power supplied to component 104c1 of domain 102c. The voltage regulator 108a, 108b, 108c may be generally referred to as voltage regulator 108 in singular, and voltage regulators 108 in plural.

In some embodiments, a domain 102 may represent a processing core, a cache, a graphics unit, a system agent, or the like. The components 104a1, . . . , 104c1 of the device 100 may represent components associated with the corresponding domain.

In some embodiments, adjacent domains 102 may be interconnected using corresponding switches. For example, the domain 102a may be interconnected to the adjacent domain 102b via a switch 112ab; the domain 102b may be interconnected to the adjacent domain 102c via a switch 112bc; and the domain 102a may be interconnected to the adjacent domain 102c via a switch 112ac (where the switches 112ab, switches 112ac, and switches 112bc are generally referred to as a switch 112 in singular, and switches 112 in plural).

In some embodiments, a controller 116 may control turning on and/or off of the switches 112. In some embodiments, a switch 112 (e.g., the switch 112ab) may interconnect two voltage regulators of the two corresponding domains (e.g., interconnect voltage regulators 108a and 108b). The switches 112 may also be referred to as "inter-domain switches."

In some embodiments, the switches 112 may be off most of the time, e.g., during a normal or regular operation of the voltage regulators 108, thereby separating the voltage regulators 108 from one another. In some embodiments, a switch 112 may be turned on for a short duration of time, for example, to discharge excess energy stored in a first domain to a second domain. For example, the switch 112ab may be turned on for a short duration of time, for example, to discharge excess energy stored in the domain 102a to the domain 102b. The switch 112ab may be turned off again after a short duration of time, for example, when sufficient energy stored in the domain 102a has been dissipated.

In some embodiments, the domain 102b may use the received energy from the domain 102a e.g., the components 104b of the domain 102b may use the energy. Additionally or alternatively, the domain 102b may safely absorb the received energy. This way, excess energy in the domain 102a may not cause an excessive overshoot of a voltage level in the domain 102a.

Figure 2:
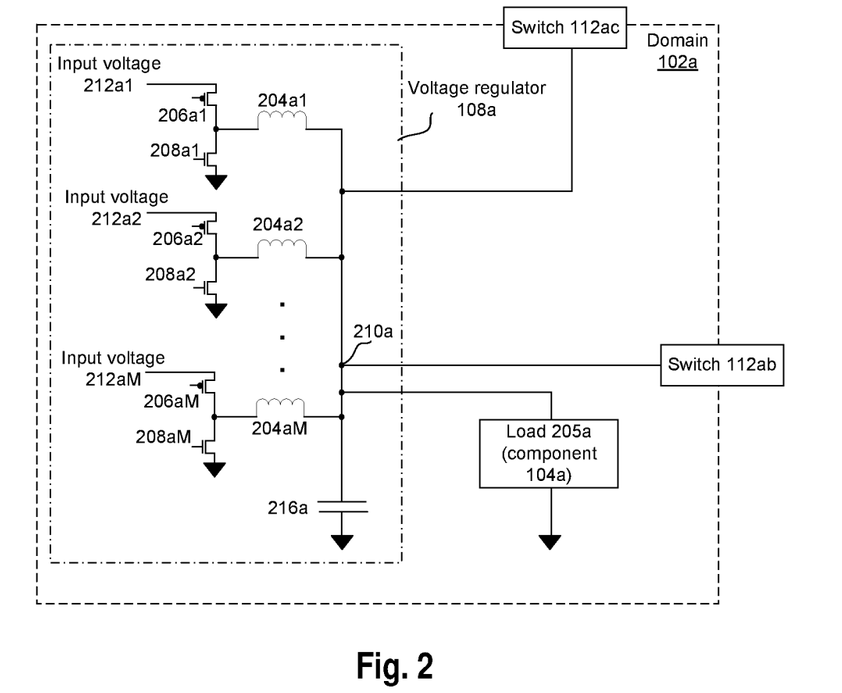
FIG. 2 illustrates an example voltage regulator of FIG. 1 in further details, where the example voltage regulator is coupled to an inter-domain switch, according to some embodiments.

FIG. 2 illustrates an example voltage regulator 108 (e.g., voltage regulator 108a) of FIG. 1 in further details, where the example voltage regulator 108 is coupled to an example inter-domain switch (e.g., switch 112ab), according to some embodiments. The voltage regulator 108a is illustrated using dashed-dotted line, and the corresponding domain 102a is illustrated using dashed lines.

In some embodiments, the voltage regulator 108a may comprise a plurality of inductors 204a1, 204a2, . . . , 204aM (e.g., although in some other embodiments, the voltage regulator 108a may comprise a single inductor as well). A first end of each of the inductors 204a1, 204a2, . . . , 204aM may be coupled to an output node 210a of the voltage regulator 108a.

A second end of individual inductors 204a1, 204a2, . . . , 204aM may be coupled to a corresponding mid-point of a corresponding pair of (e.g., complimentary pair of) transistors. For example, a second end of the inductor 204a1 may be coupled to a corresponding mid-point of a corresponding pair of (e.g., complimentary pair of) transistors 206a1 and 208a1. In some embodiments, the transistors 206a1 and 208a1 may be connected in series between an input voltage 212a1 and the ground. In some embodiments, a driver circuitry (not illustrated in FIG. 2) may drive the gates of the transistors 206a1 and 208a1. In some embodiments, the driver circuitry (not illustrated in FIG. 2) may drive the gates of the transistors 206a1 and 208a1 based on pulse width modulation, and a duty cycle of the pulse width modulation may determine an average voltage received at the second end of the inductor 204a1. For example, when the transistor 206a1 is on and the transistor 208a1 is off, the second end of the inductor 204a1 may receive the input voltage 212a1; and when the transistor 206a1 is off and the transistor 208a1 is on, the second end of the inductor 204a1 may be grounded. Thus, in some embodiments, an average voltage received at the second end of the inductor 204a1 may be based on a duty cycle of turning on and off of the transistors 206a1 and 208a1.

In some embodiments, the second end of the other inductors 204a2, . . . , 204aM may also be coupled to corresponding pair of transistors, as illustrated in FIG. 2. The voltage regulator 108a may regulate the voltage at the output node 210a by, for example, appropriately driving the transistors 206a1, 208a1, 206a2, 208a2, . . . , 206aM, 208aM.

In some embodiments, the output node 210a may be coupled to the ground via a capacitor 216a. In some embodiments, the output node 210a may also be coupled to a load 205a. The load 205a, for example, may comprise one or more of the components 104a1, 104a2, or 104a3. In some embodiments, the switches 112ab and 112ac may be coupled to the output node 210a.

Although FIG. 2 illustrates an example implementation of the voltage regulator 108a, any other implementation of the voltage regulator 108a may also be possible. The teachings of the disclosure are not limited by any specific type or implementation of the voltage regulator 108a.

Only relevant components of the voltage regulator 108a are illustrated in FIG. 2. The voltage regulator 108a may comprise various other components (e.g., drivers, operational amplifiers, pulse-width-modulation circuitry, etc.), which are not illustrated in FIG. 2 for purpose of illustrative clarity and in order to not obfuscate the teachings of this disclosure.

FIG. 2 illustrates the voltage regulator 108a of the domain 102a. The voltage regulators 108b and 108c of the domains 102b and 102c, respectively, may be at least in part similar to the voltage regulator 108a.

Figure 3:
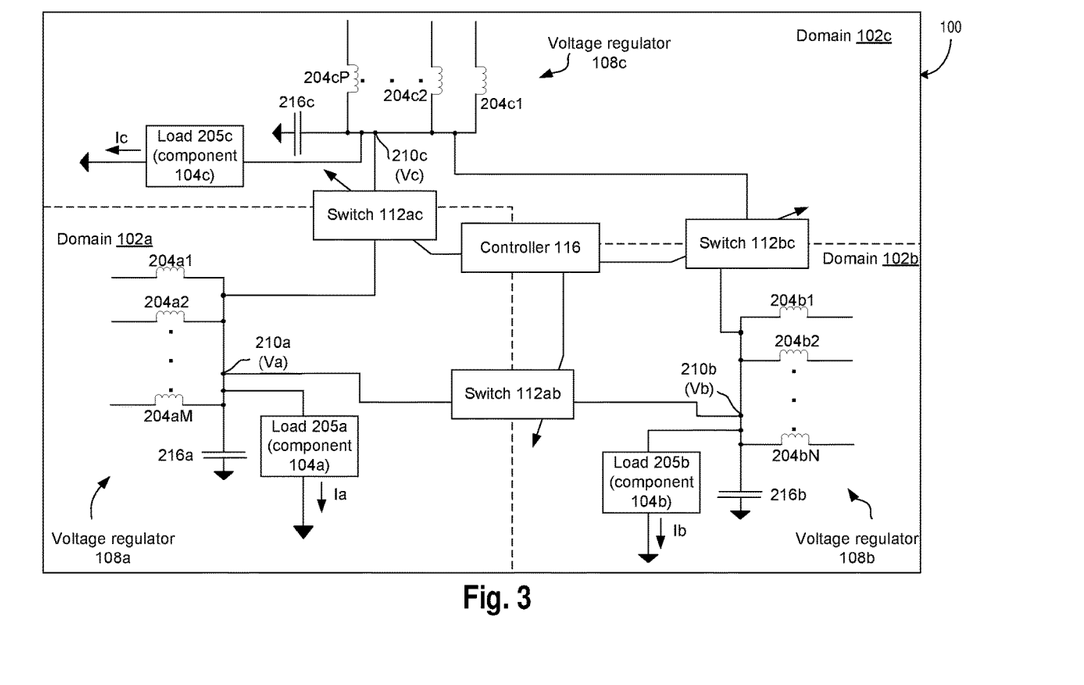
FIG. 3 illustrates the device of FIG. 1 is further details, according to some embodiments.

FIG. 3 illustrates the device 100 of FIG. 1 is further details, according to some embodiments. For example, in FIG. 3, the voltage regulators 108a, 108b, and 108c are illustrated in further details.

As discussed with respect to FIG. 2, a voltage regulator 108 may comprise multiple inductors 204, with each inductor being coupled to a corresponding pair of complimentary transistors. For purposes of illustrative clarity, the inductors of the voltage regulators 108a, 108b, and 108c are illustrated in FIG. 3, without illustrating the corresponding pairs of transistors.

For example, the voltage regulator 108a may comprise the inductors 204a1, . . . , 204aM, the voltage regulator 108b may comprise inductors 204b1, . . . , 204bN, and the voltage regulator 108c may comprise inductors 204c1, . . . , 204cP. The voltage regulators 108a, 108b, and 108c may comprise output nodes 210a, 210b, and 210c, respectively, and load 205a, 205b, and 205c, respectively, coupled to the corresponding output node. In some embodiments, the voltage regulators 108a, 108b, and 108c may comprise capacitors 216a, 216b, and 216c, respectively, coupled between the corresponding output node and the ground.

Although FIG. 3 illustrates each output node 210a, 210b, and 210c being coupled to the ground via a respective one of the capacitors 216a, 216b, and 216c, in some embodiments, an output node 210 may be coupled to the ground via more than one corresponding capacitor 216. For example, the output node 210 may be coupled to the ground via the capacitor 216a and via another capacitor of the domain 102a (where the another capacitor is not illustrated in FIG. 3). Merely as an example, a package capacitance and a die capacitance of the voltage domain 102a may be coupled to the output node 210a.

In some examples, voltages at the output nodes 210a, 210b, and 210c may be denoted as Va, Vb, and Vc, respectively, as illustrated in FIG. 3. In some examples, load currents through the load 205a, 205b, and 205c may be denoted as Ia, Ib, and Ic, respectively, as illustrated in FIG. 3.

In some embodiments, the output node 210a of the voltage regulator 108a may be coupled to the output node 210b of the voltage regulator 108b via the switch 112ab. In some embodiments, the output node 210a of the voltage regulator 108a may be coupled to the output node 210c of the voltage regulator 108c via the switch 112ac. In some embodiments, the output node 210b of the voltage regulator 108b may be coupled to the output node 210c of the voltage regulator 108c via the switch 112bc. In some embodiments, the controller 116 may control turning on and off of the switches 112ab, 112ac, and 112bc.

Individual ones of the switches 112 may be implemented, for example, one or more transistors. Merely as an example, a switch 112 may be implemented by a corresponding transistor, e.g., a field-effect transistor (FET) or another appropriate type of transistor. The controller 116 may control a gate terminal of the transistor, e.g., thereby controlling an on state and an off state of the switch 112.

Figure 4:
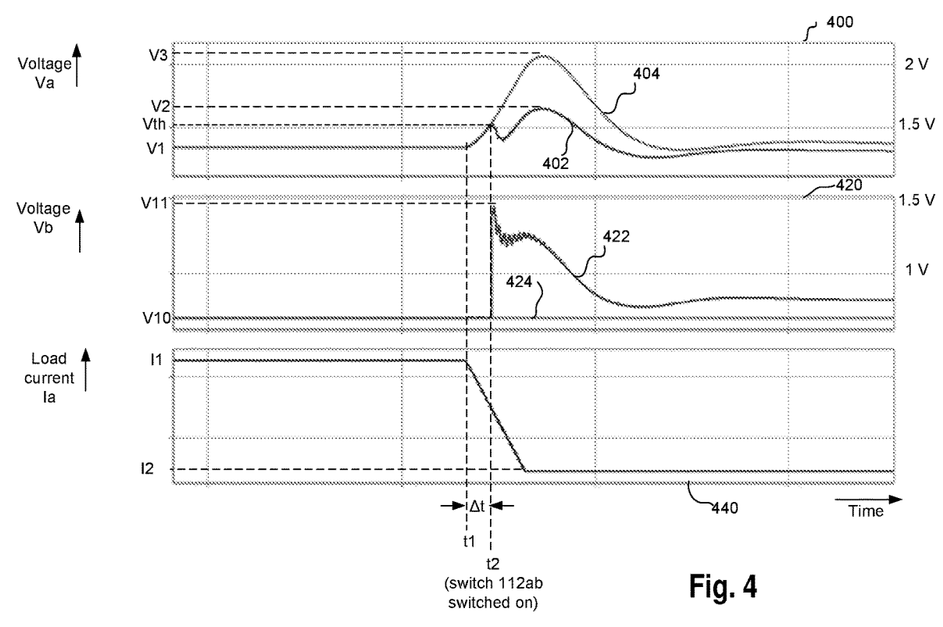
FIG. 4 illustrates graphs that depict switching of an inter-domain switch, according to some embodiments.

FIG. 4 illustrates graphs 400, 420 and 440 that depict switching of an inter-domain switch (e.g., switch 112ab), according to some embodiments. All three graphs 400, 420 and 440 have time in the X axis. The Y axis of the top graph 400 depicts voltage Va of the output node 210a of domain 102a, the Y axis of the middle graph 420 depicts voltage Vb of the output node 210b of domain 102b, and the Y axis of the bottom graph 440 depicts load current Ia of the domain 102a. The right side of the graphs 400 and 420 provides example voltage scales for the voltages Va and Vb, respectively.

In the graph 400, two lines 404 and 402 are depicted. The line 404 corresponds to a first scenario where the switch 112ab is not turned on at all, and the line 402 corresponds to a second scenario where the switch 112ab is turned on at time t2. The lines 402 and 404 overlap prior to time t2 (e.g., when the switch 112ab is off for both the scenarios).

In the graph 420, two lines 424 and 422 are depicted. The line 424 corresponds to the first scenario where the switch 112ab is not turned on at all, and the line 422 corresponds to the second scenario where the switch 112ab is turned on at time t2. The lines 422 and 424 overlap prior to time t2 (e.g., when the switch 112ab is off for both the scenarios).

Referring to the graph 440, prior to time t2, the load current Ia may be equal to about I1. During this time (e.g., prior to time t1), the voltage Va may be equal to about V1, and the voltage Vb may be equal to about V10. From time t1, the load current may start rapidly decreasing due to, merely as an example, the load 205a of the domain entering a low activity mode (e.g., a low power mode, a sleep mode, etc.).

In some embodiments, due to the sudden decrease in the load current Ia from time t1, there may be transient overshoot in the voltage Va. For example, if the switch 112ab is not switched on (e.g., in the above discussed first scenario), the sudden decrease in the load current Ia may result in an overshoot of the voltage Va to about a value V3, as depicted in the line 404 of the graph 400. For example, prior to time t1, energy may be stored in the inductors 204a1, . . . , 204aM (e.g., from the input voltages 212a1, . . . , 212aM). Such energy may be dissipated via the capacitor 216a and the load 205a.

However, if the load current Ia decreases suddenly, the capacitor 216a may not be sufficient to suppress the overshoot satisfactorily, due to which there may be such a large overshoot of the voltage Va. The controlling of the transistors 206a and/or 208a may cut off the input voltages 212a from the output node 210a and eventually bring down the voltage Va, but such operations to bring down the voltage Va may not be fast enough to prevent the large transient overshoot of the voltage Va (e.g., may not be fast enough to maintain the transient overshoot of the voltage Va within a design target).

Also, in the first scenario where the switch 112ab is not switched on at time t2, the domain 102a may not affect the domain 102b. Hence, in this first scenario, the voltage Vb may be maintained at V10, as depicted by the line 424 in the graph 420.

Voltage overshoot in a domain (e.g., overshoot of voltage Va, as depicted by line 404 in graph 400) may be a problem for the domain. For example, without the switching on of the switch 1121b, the voltage Va may be as high as V3, which may be higher than acceptable target (which may be, for example, 2 V). For example, the difference between voltages V1 and V3 in the graph 400 can be as high as about 720 mV. Such an overshoot may result in failure of one or more components in the domain 102. For example, a high rate of change in current with respect to time (e.g., a high di/dt, where di may represent a change in load current Ia, and dt may represent change in time) may result in such an overshoot of voltage Va, e.g., because the capacitor 216a may not have enough capacity to ground the excess stored energy of the inductors 204a fast enough.

In some embodiments, to avoid such potential overshoot in the voltage Va (e.g., which may occur due to the rapid decrease in the load current Ia, and/or due to the inability of the capacitor 216a to suppress the output voltage of the voltage regulator 108a sufficiently fast), at time t2, the switch 112ab may be turned on by the controller 116. For example, the voltage Va may start increasing from time t1. The controller 116 may sense such an increase in the voltage Va, and turn on the switch 112ab.

In some embodiments, once the voltage Va exceeds a threshold voltage Vth, the controller 116 may turn on the switch 112ab (e.g., at time t2). For example, the controller 116 (or another appropriate component of the device 100) may monitor a value of the voltage Va, and may turn on the switch 112ab based on such monitoring.

In some embodiments, after a short delay (e.g., Δt, as illustrated in FIG. 4) from the start of decrease of the current Ia, the controller 116 may turn on the switch 112ab (e.g., at time t2).

In some embodiments, the controller 116 may turn on the switch 112ab based on anticipating that the load current Ia may rapidly decrease and/or based on anticipating that there may be an overshoot in the voltage Va. For example, the controller 116 (or another appropriate component of the device 100) may monitor pending task or activity in pipeline that has to be executed by components (e.g., components 104a) of the domain 102a. The pipeline, for example, may be a load pipeline of a microprocessor. When the pending task or activity in the pipeline is about to be exhausted (e.g., when the components of the domain 102a are to complete all the pending task in the pipeline), the load current Ia may be about to decrease (e.g., as the load on the components of the domain 102a may be about to decrease). Based on anticipating or detecting a decrease in the pending task or activity in the pipeline and/or anticipating a decrease in the load current Ia, the controller 116 may turn on the switch 112ab (e.g., at time t2).

In some embodiments, the controller 116 may turn on the switch 112ab based on monitoring a power state of the components of the domain 102a. For example, if the domain 102a (or the device 100) is to enter a low power state (e.g., in accordance with the Advanced Configuration and Power Interface (ACPI) standard or another appropriate standard), the load of the components 104a is to likely reduce rapidly, and the load current Ia is also to likely reduce rapidly. In some embodiments, based on detecting and/or anticipating such transition of a power state, the controller 116 may turn on the switch 112ab (e.g., at time t2).

In some embodiments, the controller 116 may monitor the load current Ia, and may turn on the switch 112ab (e.g., at time t2) based on detecting a rapid decrease in the load current Ia. For example, the controller 116 may monitor di/dt (e.g., change of current with respect to time), and may turn on the switch when the change in load current Ia with respect to time exceeds a threshold rate, e.g., exceeds about t1 Ampere (A) per nanosecond (ns) or 1 A/ns, where t1 may have any appropriate value.

In some other embodiments, the controller 116 may turn on the switch 112ab based on a combination of two or more of the above discussed criteria, or any other appropriate criterion.

In some embodiments, once the switch 112ab is turned on, the energy stored in the indictors 204a2, . . . , 204aM may be transferred to or discharged through the capacitor 216b (e.g., in addition to being transferred to or discharged through the capacitor 216a). For example, now there may be two paths for the energy transfer for the inductors 204a2, . . . , 204aM: one via the capacitor 216a, and another via the capacitor 216b.

In some embodiments, the additional path connecting the inductors 204a2, . . . , 204aM (e.g., via the capacitor 216b) may greatly reduce or about eliminate the overshoot of the voltage Va from time t2 onwards. For example, as depicted by the line 402, the overshoot of the voltage Va is as high as V2 (e.g., the maximum overshoot of the voltage Va is about V2). As illustrated in graph 400, V2 may be substantially less than the voltage V3 (e.g., where V3 may be the maximum overshoot of the voltage Va if the switch 112ab is never turned on).

Merely as an example, a difference between the voltages V3 and V1 may be about 720 mV, whereas a difference between the voltages V2 and V1 may be about 303 mV. In an example, about 58% reduction in a maximum overshoot may be observed. In an example, the maximum overshoot in the voltage Va, if the switch 112ab is turned on, may be about 1.6 V, as illustrated in the graph 400.

In some embodiments, in response to the switch 112ab being turned on, the overshoot in the voltage Va of the domain 102a may decrease. However, such a decrease may result in a corresponding overshoot in the voltage Vb in the domain 102b, e.g., as depicted by the line 422 in the graph 420. However, such an increase in the voltage Vb may be within a permissible range of the voltage Vb. Merely as an example, the maximum overshoot in the voltage Vb may be slightly less than 1.5 V, e.g., which may be less than a maximum allowable overshoot of 1.8 V in the domain 102b. Note that in the example of FIG. 4, the voltage scales in the graphs 400 and 420 may be different, as noted in the right side of these two graphs.

In some embodiments, the switch 112ab may turned off once, for example, the voltage Va settles down (e.g., the overshoot in the voltage Va is mitigated or at least reduced). For example, once the stored energy in the inductors of the voltage regulator 108a is sufficiently dissipated through the capacitors 216a and 216b and the voltage Va is below a threshold voltage level, the switch 112ab may turned off. Additionally or alternatively, the switch 112ab may turned off, for example, after a pre-determined time of switching on the switch 112ab.

In some embodiments, in addition to (or instead of) turning on the switch 112ab, the switch 112ac may also be turned on (e.g., from about time t2). This may generate an additional path via the capacitor 216c to discharge the excess energy stored in the inductors 204a of the voltage regulator 108a. If, for example, both the switches 112ab and 112ac are turned on simultaneously (or near simultaneously), this may result in further reduction in the overshoot of the voltage Va.

In some embodiments, the turning on of the switch 112ab may not work when, for example, both the domains 102a and 102b may simultaneously (or near simultaneously) experience a rapid decrease in respective load currents Ia and Ib. In some embodiments, if such a situation arises, the switch 112ab may not be turned on. In an example, such a situation may arise relatively rarely. In some embodiments, in such a situation, the switches 112ac and/or 112bc (e.g., instead of the switch 112ab) may be selectively turned on, e.g., for discharging the load currents through the capacitor 216c.

Leveraging capacitance of adjacent voltage domains, e.g., for mitigation or reduction of voltage overshoot in a domain (e.g., by selectively turning on inter-domain switches) may have several technical effects. For example, reduction of voltage overshoot in the domain 102a may prevent or reduce any damage to the components 104a, e.g., due to such voltage overshoot. Additionally, the voltage increase across the capacitor 216b may be provided to the load 205b. For example, if the load 205b is operational (e.g., is consuming load current Ib) at the time the switch 112ab is turned on, energy may be transferred from the domain 102a to the domain 102b, which may be consumed by the load 205b. Thus, the excess energy of the inductors 204a (which otherwise would have been wasted by grounding via the capacitor 216a, if the switch 112ab was not turned on) may now be consumed by the load 205b, via the switch 112ab. This may result in better overall energy efficiency of the device 100. In some embodiments, dissipating the excess energy via multiple capacitors may also result in better thermal management (e.g., as the excess energy is dissipated in a larger die area, which may result in easier thermal management).

Figure 5:
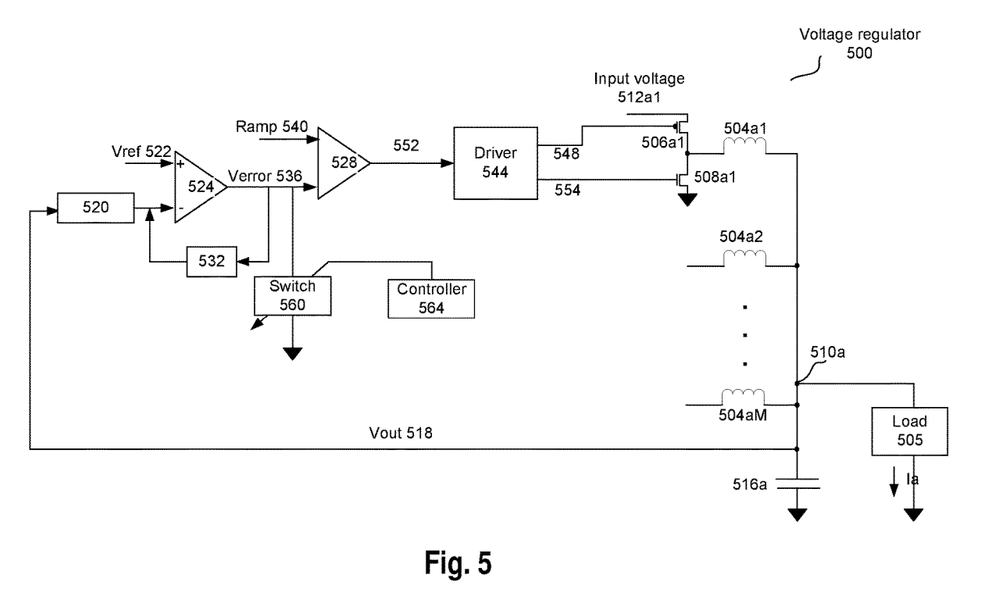
FIG. 5 schematically illustrates a voltage regulator comprising a switch, where the 560 may be selectively activated to clamp an error voltage of the voltage regulator to ground to reduce a transient voltage overshoot in the voltage regulator, according to some embodiments.

FIG. 5 schematically illustrates a voltage regulator 500 comprising a switch 560, where the switch 560 may be selectively activated to clamp an error voltage of the voltage regulator 500 to ground to reduce a transient voltage overshoot in the voltage regulator 500, according to some embodiments. In some embodiments, the voltage regulator 500 may be, at least in part, similar to the voltage regulator 108a of FIG. 2. In some embodiments, the voltage regulator 500 may be used in the device 100 (e.g., used for the voltage regulators 108a, 108b, and/or 108c).

For example, similar to the voltage regulator 108a of FIG. 2, the voltage regulator 500 may comprise inductors 504a1, 504a2, . . . , 504aM. A respective first end of the inductors 504a1, 504a2, . . . , 504aM may be coupled to an output node 510a. A voltage of the output node 510a may be an output voltage of the voltage regulator 500, and may be denoted by Vout 518.

In some embodiments, a load 505 may be coupled between the output node 510a and the ground. In some embodiments, a capacitor 516a may be coupled between the output node 510a and the ground. Although not illustrated in FIG. 5, in some embodiments, the output node 510a may be coupled to one or more inter-domain switches, e.g., switches 112ab and/or 112ac of FIGS. 1-3, where these switches may operate as discussed with respect to FIGS. 1-4.

In some embodiments, a respective second end of the inductors 504a1, 504a2, . . . , 504aM may be coupled to a corresponding pair of transistors (e.g., as discussed with respect to FIG. 2). For example, a second end of the inductor 504a1 may be coupled to transistors 506a1 and 508a1. Similarly, the second end of one or more of the inductors 504a2, . . . , 504aM may also be coupled to corresponding pairs of transistors, although such transistors are not illustrated in FIG. 5 for purposes of illustrative clarity.

In some embodiments, the transistors 506a1 and 508a1 may be coupled between an input voltage 512a1 and ground, and the second end of the inductor 504a1 may be coupled from a mid-point of the transistors 506a1 and 508a1.

In some embodiments, the voltage regulator 500 may comprise an operational amplifier 524, which may compare a reference voltage Vref 522 and a feedback of the output voltage Vout 518. For example, the output voltage Vout 518 may be feedback, through an input impedance 520, to an inverting node of the operational amplifier 524. The reference voltage Vref 522 may be received in a non-inverting node of the operational amplifier 524.

An output of the operational amplifier 524 may be an error voltage Verror 536. The error voltage Verror 536 may provide an indication of a difference between a scaled version of the output voltage Vout 518 (e.g., as scaled by the impedance 520) and the reference voltage Vout 522. In some embodiments, the operational amplifier 524 may also receive a feedback of the error voltage Verror 536 in the inverting node of the operational amplifier 524 (e.g., through an impedance 532).

In some embodiments, the voltage regulator 500 may comprise a comparator 528, which may compare the error voltage Verror 536 and an input Ramp 540. Ramp 540 may be used for determining the switching frequency of the voltage regulator and determining the dynamic pulse-width modulated drive signals.

An output signal 552 of the comparator 528 may be provided to a driver 544, which may drive the transistors 506a1 and 508a1 via signals 548 and 554, respectively. In some embodiments, the signals 548 and/or 554 may be pulse-width modulated (PWM) signals that may control switching on and off of the transistors 506a1 and 508a1. In some embodiments, the signal 554 may provide an indication of a duty cycle of the PWM signals 548 and/or 554.

Merely as an example, when the duty cycle of the driver 544 of the voltage regulator 500 is 100%, the transistor 506a1 may be on for all the time and the transistor 508a1 may be always off, e.g., thereby providing the input voltage 512a1 to the inductor 504a1 at all time. On the other hand, when the duty cycle of the driver 544 of the voltage regulator 500 is 0%, the transistor 506a1 may be off for all the time and the transistor 508a1 may be always on, thereby not providing the input voltage 512a1 to the inductor 504a1 at all and rather connecting to ground. The duty cycle of the driver 544 may provide a ratio of an amount of time for which the inductor 504a1 receives the input voltage 512a1 and an amount of time for which the inductor 504a1 does not receive the input voltage 512a1. The duty cycle of the driver 544 may range between 0 and 1.

In some embodiments, the error voltage Verror 536 may drive the duty cycle of the driver 544. For example, if the error voltage Verror 536 indicates that the output voltage Vout 518 is higher than the reference voltage Vref (e.g., implying that the output voltage Vout 518 may have to be increased), the duty cycle may have to be decreased. On the other hand, if the error voltage Verror 536 indicates that the output voltage Vout 518 is lower than the reference voltage Vref (e.g., implying that the output voltage Vout 518 may have to be decreased), the duty cycle may have to be accordingly increased.

In some embodiments, the voltage regulator 500 may also comprise the switch 560 that may selectively ground the inverting node of the operational amplifier 528 (e.g., may reduce the error voltage Verror 536 to zero or near zero). This may be a faster way to reduce Verror 536 to close to zero, e.g., as the voltage regulator control loop may be bypassed while reducing the error voltage Verror 536 to zero or near zero. The switch 560 may be implemented using, for example, one or more transistors (e.g., using a FET).

In some embodiments, a controller 564 may control a turning on an off of the switch 560. For example, the controller 564 may control a gate of a transistor used to implement the switch 560, thereby controlling the switch 560.

In some embodiments, turning on the switch 560 may drive the error voltage Verror 536 to a low value, e.g., zero or near zero. This may, for example, drive the duty cycle to go to a low value faster (e.g., zero or near zero) until, for example, there is a change in the error voltage Verror 536 through the default voltage regulator control loop.

In some embodiments, whenever a spike or transient overshoot in the output voltage Vout 518 is detected or anticipated, the switch 560 may be turned on, which may in turn reduce the duty cycle of the PWM of the driver 544 to a low value (e.g., zero or near zero). This may couple the inductor 504a1 to the ground (e.g., instead of coupling the inductor 504a1 to the input voltage 512a1), which may in turn help in prevent or at least reduce an overshoot in Vout 518, e.g., by reducing the stored energy in the inductor 504a1.

Without the switch 560, the transient overshoot in Vout 5188 may be detected by the operational amplifier 524, which may in turn be reflected in the error voltage, which in turn may result in reduction of the duty cycle. However, such a feedback effect of the voltage regulator 500 may take some time. Instead, in some embodiments, the switch 560 may be turned on instantaneously or almost instantaneously, e.g., in anticipation of or in response to detecting an overshoot in Vout 518, which may prevent or reduce the overshoot in Vout 518.

In some embodiments, as the switch 560 may clamp the error voltage Verror 536 to ground, the switch 560 may also be referred as an error voltage clamping switch.

The controller 564 may turn on the switch 560 based on one or more appropriate criteria. For example, in some embodiments, once the voltage Vout 518 exceeds a threshold voltage, the controller 564 may turn on the switch 560, thereby reducing an overshoot of Vout 518.

In some embodiments, the controller 564 may turn on the switch 560 after a delay of, for example, $\Delta t_1$ after a start of the transient overshoot, e.g., as discussed herein later.

In some embodiments, the controller 564 may turn on the switch 560 based on anticipating that the load current Ia may rapidly decrease and/or based on anticipating that there may be an overshoot in the voltage Va. For example, the controller 564 (or another appropriate component, e.g., a pipeline estimation logic not separately illustrated in the figure) may monitor pending task or activity in a pipeline that has to be executed by components of the load 505. When the pending task or activity in the pipeline is about to be exhausted (e.g., when the load 505 is to complete all the pending task), the load current Ia may be about to decrease. Based on such anticipating or detecting a decrease in the pending task or activity in the pipeline and/or anticipating or detecting a decrease in the load current Ia, the controller 564 may turn on the switch 560. For such embodiments, the controller 564 may include, or may communicate with the pipeline estimation logic that may estimate or monitor pending task or activity in the pipeline associated with the load 505.

In some embodiments, the controller 564 may turn on the switch 560 based on monitoring a power state of the load 505. For example, if the load 505 is to enter a low power state (e.g., in accordance with the ACPI standard or another appropriate standard), the load current Ia is to likely reduce rapidly. In some embodiments, based on anticipating and/or detecting such transition of a power state, the controller 564 may turn on the switch 560.

In some embodiments, the controller 560 may monitor the load current Ia, and may turn on the switch 564 based on detecting a rapid decrease in the load current Ia (e.g., when the change in load current Ia with respect to time, or the rate of decrease of the load current Ia, exceeds a threshold rate).

In some other embodiments, the controller 564 may turn on the switch 560 based on a combination of two or more of the above discussed criteria, or any other appropriate criterion.

Figure 6:
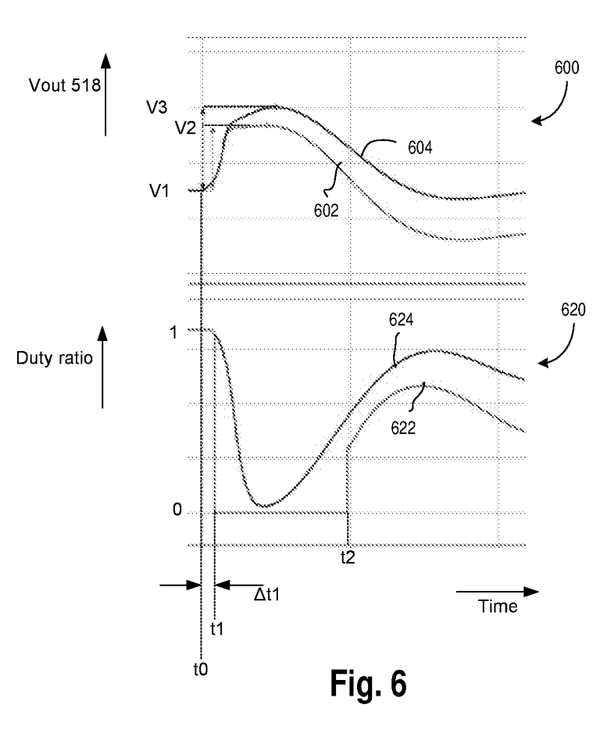
FIG. 6 illustrates graphs that depict effects of turning on an error voltage clamping switch, according to some embodiments.

FIG. 6 illustrates graphs 600 and 620 that depict effects of turning on an error voltage clamping switch (e.g., switch 560), according to some embodiments. The graphs 600 and 620 have time in the X axis. The Y axis of the top graph 600 depicts output voltage Vout 518 of the output node 510a, the Y axis of the bottom graph 620 depicts the duty ratio of the voltage regulator 500.

In the graph 600, two lines 602 and 604 are illustrated. The line 604 corresponds to a first scenario where the switch 560 is not turned on, and the line 602 corresponds to a second scenario where the switch 560 is turned on at time t1.

In the graph 620, two lines 622 and 624 are illustrated. The line 624 corresponds to the first scenario where the switch 560 is not turned on, and the line 622 corresponds to the second scenario where the switch 560 is turned on at time t1.

Referring to the graphs 600 and 620 and assuming the first scenario in which the switch 560 is never turned on (e.g., corresponding to the lines 604 and 624), at time t0, Vout 518 may start increasing (e.g., due to a decrease in the load current Ia, or another transient event). The voltage regulator 500 may detect this rise (e.g., via the feedback of Vout 518), and may start to gradually reduce the duty cycle, e.g., as depicted by the line 624. However, the reduction of the duty cycle may not be fast enough, and Vout may overshoot from voltage V1 to about voltage V3, and then start reducing gradually. However, in an example, the voltage V3 may be too high for one or more components of the load 505, and may potentially damage such components.

Referring again to the graphs 600 and 620 and assuming the second scenario in which the switch 560 is electively turned on (e.g., corresponding to the lines 602 and 622), at time t0, Vout 518 may start increasing (e.g., due to a decrease in the load current Ia, or for another reason). The controller 564 may detect this increase (or may anticipate this increase in advance, e.g., using the above discussed pipeline estimation logic or by another appropriate manner). In some embodiments, the controller 564 may decide, at time t1 (e.g., after a delay of $\Delta t1$ after time t0), to turn on the switch 560, thereby clamping Verror 536 to at or near zero voltage. Accordingly, the duty ratio may immediately be reduced from a high value to zero or near zero, e.g., as depicted by the line 622. For example, the duty ratio for this second scenario may decrease at a much rapid rate (e.g., as depicted by the line 622), e.g., compared to a decrease in the duty cycle (e.g., as depicted by the line 624) when the switch 560 is not turned on.

In some embodiments, turning on of the switch 560 and reducing the duty ratio to zero or near zero may decrease the overshoot of Vout 518—the maximum overshoot may now be from voltage V1 to voltage V2. As illustrated in the graph 600, the maximum overshoot V2 (e.g., when the switch 560 is turned on) may be relatively lower than the maximum overshoot V3 (e.g., when the switch 560 is not turned on).

For example, the voltage V2 may be within permissible voltage limit of the load 505, thereby not damaging the load 505.

Merely as an example, the maximum overshoot V3 for the scenario in which the switch 560 is not turned on may be about 226 mV, and the maximum overshoot V2 for the scenario in which the switch 560 is selectively turned on may be about 177 mV. Thus, in this example, the maximum overshoot V2 may be decreased by about 22%. In another example, the the maximum overshoot V2 may be decreased by about 50%. In some embodiments, due to a decrease in the maximum overshoot, the components of the load 505 may not be damaged.

In some embodiments, the difference between time t0 and time t1 may be in sub-nano second range (e.g., less than 1 ns). Thus, the duty ratio clamping may occur almost immediately after the transient event causing overshoot of voltage Vout 518.

Figure 7:
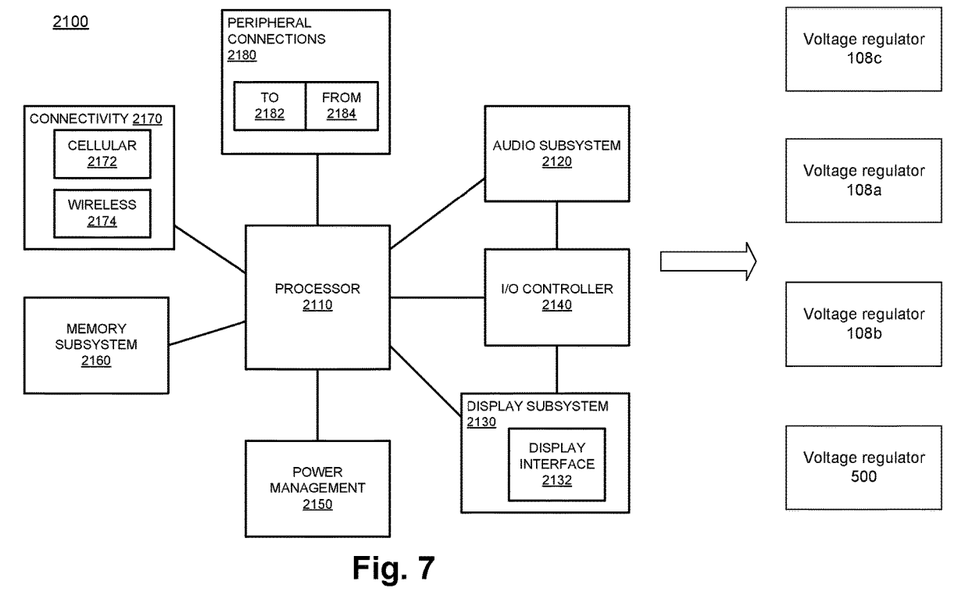
FIG. 7 illustrates a computer system, computing device or a SoC (System-on-Chip), where a transient overshot of a voltage regulator output may be reduced by selectively turning on a switch, in accordance with some embodiments.

FIG. 7 illustrates a computer system, computing device or a SoC (System-on-Chip) 2100, where a transient overshoot of a voltage regulator output may be reduced by selectively turning on a switch, in accordance with some embodiments. It is pointed out that those elements of FIG. 7 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise one or more voltage regulators, e.g., voltage regulators 108*a*, 108*b*, 108*c*, and/or 500 of FIGS. 1-6. In some embodiments, these voltage regulators may be associated with corresponding inter-domain switches (e.g., switches 112*ab*, 112*bc*, 112*ac*) and/or error voltage clamping switches (e.g., switch 560). In some embodiments, one or more of these switches may mitigate or at least reduce any potential overshoot in output voltages of one or more of these voltage regulators. In some embodiments, the voltage regulators 108*a*, 108*b*, 108*c*, and/or 500 may supply regulated voltages to various components of the computing device 2100.

In some embodiments, the voltage regulators discussed herein may be present in a computing device (e.g., the computing device 2100), or may be present in standalone Power Management Integrated Circuit (PMIC) or a similar system.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1. An apparatus comprising: a first voltage regulator; a second voltage regulator; and a switch to selectively couple the first voltage regulator to the second voltage regulator, such that a first output node of the first voltage regulator is temporarily coupled to a second output node of the second voltage regulator via the switch.

Clause 2. The apparatus of clause 1, further comprising: a controller to turn on the switch, in response to an overshoot in an output voltage of the first voltage regulator.

Clause 3. The apparatus of clause 2, wherein the controller is to turn off the switch subsequent to one or both of: the overshoot in the output voltage decreasing below a threshold value, or a pre-determined period of time after turning on the switch.

Clause 4. The apparatus of clause 1, further comprising: a controller to turn on the switch, in response to a rate of decrease in a load current of the first voltage domain being higher than a threshold rate.

Clause 5. The apparatus of clause 1, further comprising: a controller to turn on the switch, in response to anticipating a decrease in a load current of the first voltage domain.

Clause 6. The apparatus of clause 1, further comprising: a pipeline estimation logic to anticipate a decrease in a load current of the first voltage domain; and a controller to turn on the switch, in response to the pipeline estimation logic anticipating the decrease in the load current.

Clause 7. The apparatus of any of clauses 1-6, further comprising: a first capacitor coupled between the first output node of the first voltage regulator and the ground; and a second capacitor coupled between the second output node of the second voltage regulator and the ground.

Clause 8. The apparatus of any of clauses 1-6, wherein: the first voltage regulator is to supply power to a first voltage domain; and the second voltage regulator is to supply power to a second voltage domain that is physically adjacent to the first voltage domain.

Clause 9. The apparatus of any of clauses 1-6, further comprising: a third voltage regulator; and another switch to selectively couple the first voltage regulator and the third voltage regulator.

Clause 10. The apparatus of clause 9, wherein: the switch is to couple the first voltage regulator and the second voltage regulator during a first time period; the another switch is to couple the first voltage regulator and the third voltage regulator during a second time period; and the first time period is to at least in part overlap with the second time period.

Clause 11. A system comprising: a memory to store instructions; a processor coupled to the memory; a first voltage domain having a first output node that is to supply an output voltage to the processor, the memory, or another component of the system; a second voltage domain having a second output node; an inter-domain switch to selectively transfer energy from the first output node to the second output node, in response to an overshoot in a first output voltage at the first output node; and a wireless interface to allow the processor to communicate with another system.

Clause 12. The system of clause 11, further comprising: a first capacitor coupled between the first output node and a ground node; and a second capacitor coupled between the second output node and the ground node, wherein at least a part of the energy from the first output node is dissipated by the second capacitor.

Clause 13. The system of clause 12, further comprising: a controller to turn on the inter-domain switch, in response to the first capacitor not being able to sufficiently rapidly dissipate the energy from the first output node.

Clause 14. The system of clause 13, wherein: the controller is to turn off the inter-domain switch, in response to the energy from the first output node being dissipated beyond a threshold level.

Clause 15. The system of any of clauses 11-14, further comprising: a third voltage domain having a third output node, wherein the energy from the first output node is dissipated by: a first one or more capacitors coupled between the first output node and a ground node, a second one or more capacitors coupled between the second output node and the ground node, and a third one or more capacitors coupled between the third output node and the ground node, wherein the first voltage domain is physically adjacent to the second voltage domain and the third voltage domain.

Clause 16. The system of any of clauses 11-14, further comprising: a first voltage regulator coupled to the first output node; and a second voltage regulator coupled to the second output node, wherein the switch is coupled between the first output node and the second output node.

Clause 17. A voltage regulator comprising: a component to compare a reference voltage and a scaled version of an output voltage of the voltage regulator, and to generate an error voltage; a driver circuit to drive one or more transistors to generate the output voltage; and a switch to selectively cause the error voltage to be zero or near zero.

Clause 18. The voltage regulator of clause 17, further comprising: another component to generate a duty cycle signal that is to control switching of the one or more transistors, wherein the switch is to selectively cause the error voltage to be zero or near zero, thereby causing a duty ratio of the duty cycle signal to be zero or near zero.

Clause 19. The voltage regulator of any of clauses 17-18, further comprising: a controller to turn on the switch, in response to an overshoot in the output voltage.

Clause 20. The voltage regulator of any of clauses 17-18, further comprising: a controller to turn on the switch, wherein the controller comprises a pipeline estimation logic that is to estimate that a load receiving the output voltage has substantially no task scheduled in a pipeline associated with the load, and wherein the controller is to turn on the switch, based on the estimate that the load has substantially no task scheduled in the pipeline.

Clause 21. A method comprising: generating, at a first output node of a first voltage regulator, a first output voltage; generating, at a second output node of a second voltage regulator, a second output voltage; and selectively coupling the first output node to the second output node.

Clause 22. The method of clause 21, wherein selectively coupling the first output node to the second output node comprises: selectively coupling the first output node to the second output node, in response to an overshoot in the first output voltage.

Clause 23. The method of clause 22, further comprising: ending the selectively coupling subsequent to one or both of: the overshoot in the first output voltage decreasing below a threshold value, or a pre-determined period of time after enabling the selective coupling.

Clause 24. The method of clause 21, wherein selectively coupling the first output node to the second output node comprises: selectively coupling the first output node to the second output node, in response to a rate of decrease in a load current from the first output node being higher than a threshold rate.

Clause 25. The method of any of clauses 21-24, further comprising: dissipating energy stored in one or more inductors of the first voltage regulator via a combination of: a first capacitor coupled to the first output node, and a second capacitor coupled to the second output node.

Clause 26. One or more non-transitory computer-readable storage media to store instructions that, when executed by a processor, cause the processor to execute a method of any of the clauses 21-25.

Clause 27. An apparatus comprising: means for performing the method of any of the clauses 21-25.

Clause 28. An apparatus method comprising: means for generating, at a first output node of a first voltage regulator, a first output voltage; means for generating, at a second output node of a second voltage regulator, a second output voltage; and means for selectively coupling the first output node to the second output node.

Clause 29. The apparatus of clause 21, wherein the means for selectively coupling the first output node to the second output node comprises: means for selectively coupling the first output node to the second output node, in response to an overshoot in the first output voltage.

Clause 30. The apparatus of clause 29, further comprising: means for ending the selectively coupling subsequent to one or both of: the overshoot in the first output voltage decreasing below a threshold value, or a pre-determined period of time after enabling the selective coupling.

Clause 31. The apparatus of clause 28, wherein the means for selectively coupling the first output node to the second output node comprises: means for selectively coupling the first output node to the second output node, in response to a rate of decrease in a load current from the first output node being higher than a threshold rate.

Clause 32. The apparatus of any of clauses 28-31, further comprising: means for dissipating energy stored in one or more inductors of the first voltage regulator via a combination of: a first capacitor coupled to the first output node, and a second capacitor coupled to the second output node.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first voltage regulator;
a second voltage regulator;
a first switch to selectively couple the first voltage regulator to the second voltage regulator, such that a first output node of the first voltage regulator is temporarily coupled to a second output node of the second voltage regulator via the first switch;
a third voltage regulator; and
a second switch to selectively couple the first voltage regulator and the third voltage regulator, wherein:
the first switch is to couple the first voltage regulator and the second voltage regulator during a first time period;
the second switch is to couple the first voltage regulator and the third voltage regulator during a second time period; and
the first time period is to at least in part overlap with the second time period.

2. The apparatus of claim 1, further comprising:
a controller to turn on the first switch, in response to an overshoot in an output voltage of the first voltage regulator.

3. The apparatus of claim 2, wherein the controller is to turn off the first switch subsequent to one or both of:
the overshoot in the output voltage decreasing below a threshold value, or
a pre-determined period of time after turning on the switch.

4. The apparatus of claim 1, further comprising:
a controller to turn on the first switch, in response to anticipating a decrease in a load current of a first voltage domain.

5. The apparatus of claim 1, further comprising:
a pipeline estimation logic to anticipate a decrease in a load current of a first voltage domain; and
a controller to turn on the first switch, in response to the pipeline estimation logic anticipating the decrease in the load current.

6. The apparatus of claim 1, wherein:
the first voltage regulator is to supply power to a first voltage domain; and
the second voltage regulator is to supply power to a second voltage domain that is physically adjacent to the first voltage domain.

7. The apparatus of claim 1, further comprising:
a first capacitor coupled between the first output node of the first voltage regulator and a ground; and
a second capacitor coupled between the second output node of the second voltage regulator and the ground.

8. An apparatus comprising:
a first voltage regulator;
a second voltage regulator;
a switch to selectively couple the first voltage regulator to the second voltage regulator, such that a first output node of the first voltage regulator is temporarily coupled to a second output node of the second voltage regulator via the switch; and
a controller to turn on the switch, in response to a rate of decrease in a load current of a first voltage domain being higher than a threshold rate.

9. The apparatus of claim 8, wherein the controller is to turn off the switch subsequent to a pre-determined period of time after turning on the switch.

10. The apparatus of claim 8, wherein the controller is to turn off the switch, in response to the rate of decrease in the load current of the first voltage domain being lower than another threshold rate.

11. The apparatus of claim 8, further comprising:
a third voltage regulator; and
another switch to selectively couple the first voltage regulator and the third voltage regulator.

12. A system comprising:
a memory to store instructions;
a processor coupled to the memory;
a first voltage domain having a first output node that is to supply an output voltage to the processor, the memory, or another component of the system;
a second voltage domain having a second output node;
an inter-domain switch to selectively transfer energy from the first output node to the second output node, in response to an overshoot in a first output voltage at the first output node; and
a wireless interface to allow the processor to communicate with another system.

13. The system of claim 12, further comprising:
a first capacitor coupled between the first output node and a ground node; and
a second capacitor coupled between the second output node and the ground node,
wherein at least a part of the energy from the first output node is dissipated by the second capacitor.

14. The system of claim 13, further comprising:
a controller to turn on the inter-domain switch, in response to the first capacitor not being able to sufficiently rapidly dissipate the energy from the first output node.

15. The system of claim 14, wherein:
the controller is to turn off the inter-domain switch, in response to the energy from the first output node being dissipated beyond a threshold level.

16. The system of claim 12, further comprising:
a third voltage domain having a third output node,
wherein the energy from the first output node is dissipated by:

a first one or more capacitors coupled between the first output node and a ground node, a second one or more capacitors coupled between the second output node and the ground node, and a third one or more capacitors coupled between the third output node and the ground node, wherein the first voltage domain is physically adjacent to the second voltage domain and the third voltage domain.

17. The system of claim 12, further comprising:

a first voltage regulator coupled to the first output node; and a second voltage regulator coupled to the second output node, wherein the switch is coupled between the first output node and the second output node.

18. A voltage regulator comprising:

a component to compare a reference voltage and a scaled version of an output voltage of the voltage regulator, and to generate an error voltage at a node;

a driver circuit to drive one or more transistors to generate the output voltage, based at least in part on the error voltage; and a switch to selectively couple the node to a ground terminal, to cause the error voltage to be substantially zero.

19. The voltage regulator of claim 18, further comprising:

another component to generate a duty cycle signal that is to control switching of the one or more transistors, wherein the switch is to selectively cause the error voltage to be substantially zero, thereby causing a duty ratio of the duty cycle signal to be substantially zero.

20. The voltage regulator of claim 18, further comprising:

a controller to turn on the switch, in response to an overshoot in the output voltage.

21. An apparatus comprising:

a first voltage regulator;

a second voltage regulator; and a switch to selectively couple the first voltage regulator to the second voltage regulator, such that a first output node of the first voltage regulator is temporarily coupled to a second output node of the second voltage regulator via the switch;

a controller to turn on the switch, in response to an overshoot in an output voltage of the first voltage regulator, wherein the controller is to turn off the switch subsequent to the overshoot in the output voltage decreasing below a threshold value; and logic to anticipate a decrease in a load current of a first voltage domain.

22. The apparatus of claim 21, further comprising:

a first capacitor coupled between the first output node of the first voltage regulator and the ground; and a second capacitor coupled between the second output node of the second voltage regulator and the ground.

23. An apparatus comprising:

a first voltage regulator;

a second voltage regulator; and a switch to selectively couple the first voltage regulator to the second voltage regulator, such that a first output node of the first voltage regulator is temporarily coupled to a second output node of the second voltage regulator via the switch;

a controller to turn on the switch, in response to an overshoot in an output voltage of the first voltage regulator, wherein the controller is to turn off the switch subsequent to a predetermined period of time after turning on the switch; and logic to anticipate a decrease in a load current of a first voltage domain, wherein the first voltage regulator is to supply power to the first voltage domain.

24. The apparatus of claim 23, further comprising:

a first capacitor coupled between the first output node of the first voltage regulator and the ground; and a second capacitor coupled between the second output node of the second voltage regulator and the ground.

25. An apparatus comprising:

a first voltage regulator;

a second voltage regulator; and a switch to selectively couple the first voltage regulator to the second voltage regulator, such that a first output node of the first voltage regulator is temporarily coupled to a second output node of the second voltage regulator via the switch;

a controller to turn on the switch in response to anticipating a decrease in a load current of a first voltage domain, wherein the first voltage regulator is to supply power to the first voltage domain.

26. The apparatus of claim 25, further comprising:

a first capacitor coupled between the first output node of the first voltage regulator and the ground; and a second capacitor coupled between the second output node of the second voltage regulator and the ground.

* * * * *